No. 703,846. Patented July 1, 1902.
D. STEWART.
APPARATUS FOR SEPARATING LIQUIDS FROM SOLIDS.
(Application filed May 27, 1901.)
(No Model.) 3 Sheets—Sheet 1.

Witnesses:
Inventor
Duncan Stewart
By James L. Norris.
Atty

No. 703,846. Patented July 1, 1902.
D. STEWART.
APPARATUS FOR SEPARATING LIQUIDS FROM SOLIDS.
(Application filed May 27, 1901.)
(No Model.) 3 Sheets—Sheet 3.

Witnesses: Inventor
Duncan Stewart
By James L. Norris.
Atty

UNITED STATES PATENT OFFICE.

DUNCAN STEWART, OF GLASGOW, SCOTLAND.

APPARATUS FOR SEPARATING LIQUIDS FROM SOLIDS.

SPECIFICATION forming part of Letters Patent No. 703,846, dated July 1, 1902.

Application filed May 27, 1901. Serial No. 62,124. (No model.)

*To all whom it may concern:*

Be it known that I, DUNCAN STEWART, a subject of the King of Great Britain, residing at London Road Iron Works, Glasgow, Scotland, have invented certain new and useful Improvements in Apparatus for Separating Liquids from Solids, (for which I have applied for a patent in Great Britain, dated October 30, 1900, No. 19,362,) of which the following is a specification.

My said invention has for its object to improve the apparatus for separating liquids from solids, my improvements being capable of wide application—such, for instance, as in the recovery of the cyanid solution of gold formed in the treatment of the slimes or tailings produced in the milling of certain gold-bearing ores with a solution of cyanid of potassium, which has hitherto been a matter of great difficulty; in the recovery of the cyanid solution from what is known as "gold-zinc" slimes, in the treatment of sewage-sludge to separate the liquid from the solids; and in order that my said invention and the manner of performing the same may be properly understood I shall describe it, referring to the accompanying drawings.

Figure 1:
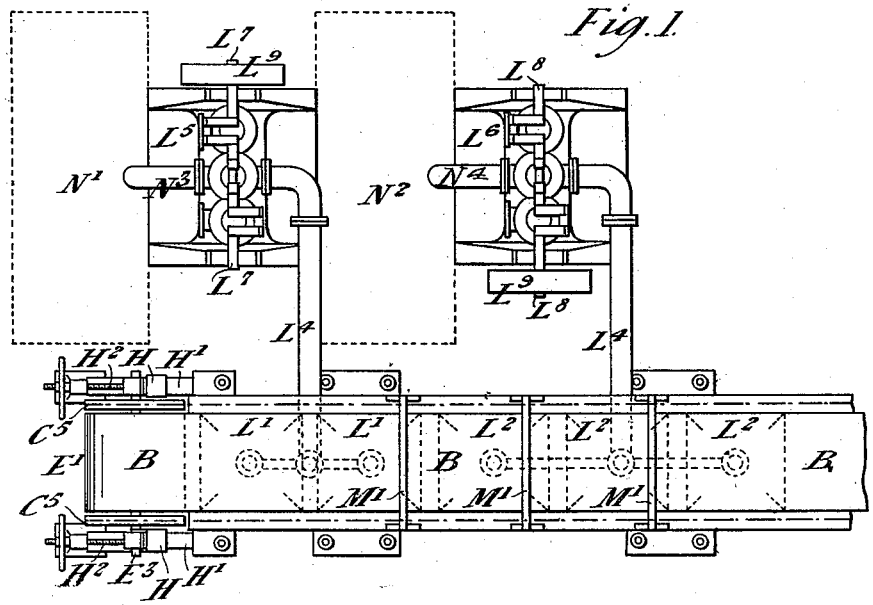
Figure 2:
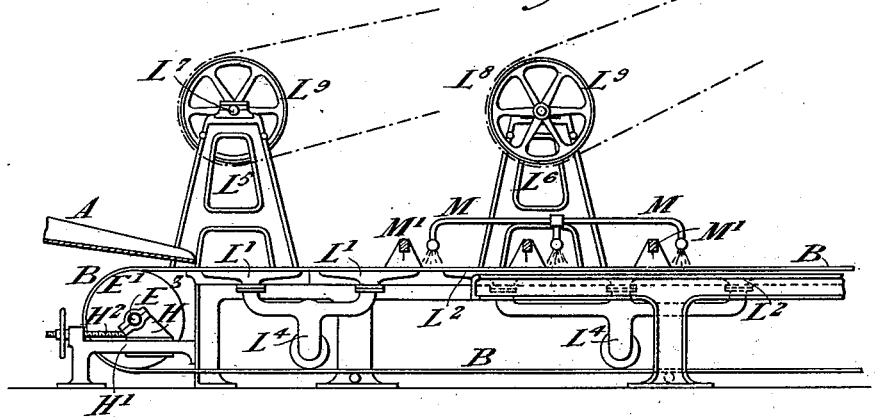
Figure 3:
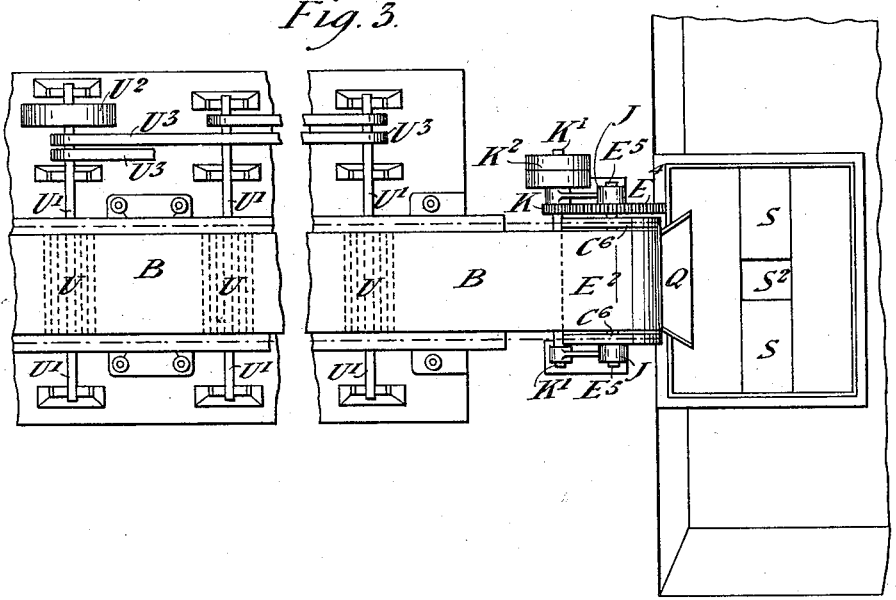
Figure 4:
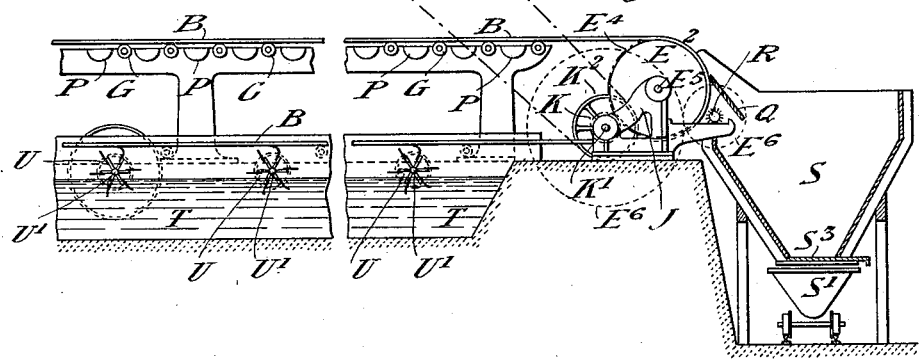
Figure 5:
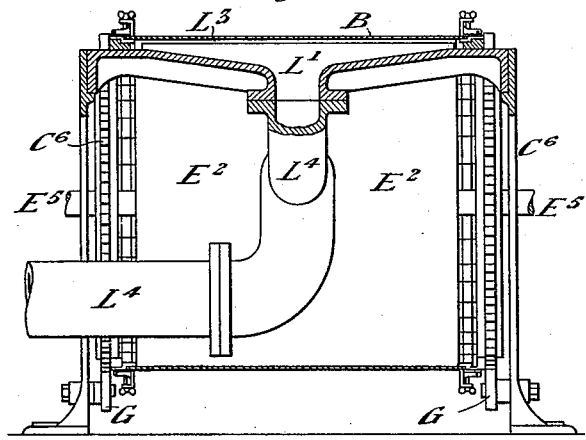
Figure 7:
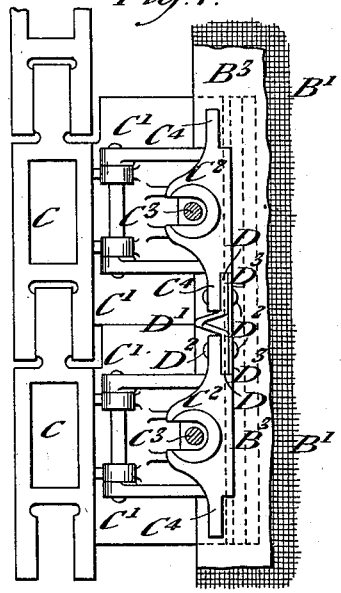
Figure 6:
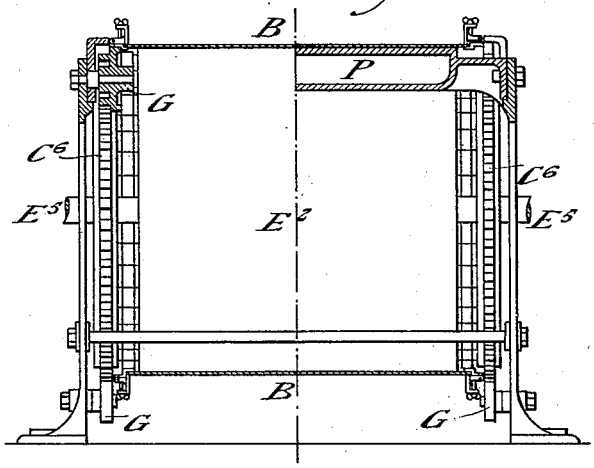
Figure 8:
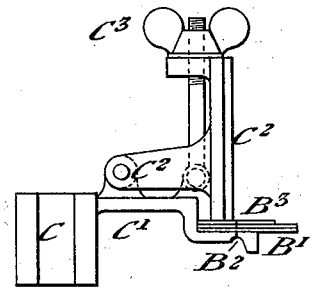

Figure 1 is a plan, and Fig. 2 is a side elevation, of a portion of apparatus according to my invention, showing the receiving end and other parts. Figs. 3 and 4 are respectively a plan and a longitudinal section of other portions of the apparatus, showing the delivery end and other parts, which may be of any desired length between this and the receiving end. Figs. 5 and 6 are transverse sections of the machine drawn to a larger scale; and Figs. 7 and 8 are respectively a plan and an end elevation, on an enlarged scale, of part of the chain and apron. In these drawings the same reference-letters are used to mark the same or like parts wherever they are repeated.

In carrying out the invention the materials to be treated are delivered from an inclined chute A onto the upper surface of an endless apron or carrier B, which may be of any desired length and consists, by preference, of layers of wire-gauze B', Figs. 7 and 8, secured at their edges to small brackets or arms C', formed on carrying-chains C, the brackets projecting some distance inward from the chains and the layers of wire-gauze being bound or fixed to the brackets by sewing, as shown at B², or by any other suitable means of fixing. In some cases—as, for example, when treating slimes or tailings—a layer of cloth or other suitable permeable material B³ is applied to the outer surface of the wire-gauze B', the cloth being secured at its edges by clips C², hinged to the arms C' of the chains C, the clips being provided with nipping or clamping screws C³, so that they may be screwed down tightly on the cloth and so hold it firmly on the wire-gauze. In order to prevent the materials from spreading laterally and falling over the edges of the apron B, flanges C⁴ are formed on the inner ends of the clips C², so as to project some distance above the apron, and thereby form comparatively deep protecting sides. The intervening space between each pair of the clip-flanges is filled by a leather tongue or cover piece or flange D, formed with a bent, flexible, or accommodating middle D', projecting outward through the space between the flanges C⁴, to which the tongue-piece D is fixed by rivets or otherwise. The filling or covering pieces are made as described, so as to allow the chains C to bend as required when passing around drums or pulleys in the course of their travel. The chains C pass around sprocket-pulleys C⁵ C⁶, fixed on shafts E³ E⁵, having on them carrying-drums E' E², arranged, respectively, at the receiving and delivery end of the apparatus, so that the apron B is thus stretched between the drums and passes around them, guide-pulleys G, Figs. 5 and 6, being provided at suitable distances apart for supporting the chains in the course of their travel. The shaft E³ of the drum E' at the receiving end of the apparatus is carried in bearings H, movable in guides H' on the framing and provided with adjusting-screws H², so that the bearings can be moved outward or inward to regulate the tension of the apron B. The drum E² at the delivery end of the apparatus is on a shaft E⁵, which is carried in fixed bearings J and has on it a spur-wheel E⁴, driven by a pinion K on a cross-shaft K', mounted on the framing and having on it fast and loose pulleys K², driven by a suitable motor. The drum E' may also be driven, if desired. The apron B is thus made to travel between and around the drums E' E² in a continuous manner. When it leaves the carrying-drum E' at the receiving end of the apparatus, it passes over two (or it may be more) sets of suction-boxes L' L², which are open at the top and have bars L³ across them to support the apron as it travels over the boxes. The boxes L' L² are connected by pipes L⁴ to suction-producing apparatus or vacuum-pumps L⁵ L⁶, worked from shafts L⁷ L⁸, driven by belts on pulleys L⁹. By this means all or most of the liquid in the materials under treatment is drawn through the permeable apron B, leaving the solid materials on its surface. Water-service pipes M are arranged over the suction-boxes L², so that, if desired, the materials may be washed as they pass over these boxes. When gold-bearing materials are treated, instead of water a weak solution of cyanid may be used, and rakes M' may extend across over the surface of the apron B at this part, so as to stir up the materials on it, and thus insure that the gold solution is thoroughly washed out as the apron travels over the last set of suction-boxes. The liquid thus obtained from the materials when it contains valuable matters—as, for instance, the liquid from slimes or tailings which contains precious metals in solution—may be pumped into tanks N' N² through discharge or delivery pipes N³ N⁴ and afterward treated by known means for the recovery of its valuable constituents. When the materials leave the suction-boxes L², they pass over drying-boxes P, which are supplied with steam and are fixed across the framing and distributed along it to almost the end of the machine, so as to dry the solid matter on the apron B. Instead of boxes P steam-coils may be employed or drying may be effected by a hot-air blast or similar means. When the dried solid matter reaches the delivery-drum E², it is removed from the apron B by means of a scraper Q, fixed across the back of the drum, and a revolving brush R, which is driven from the cross-shaft K' through spur-gearing E⁶ and brushes against the surface of the apron B, thereby thoroughly removing particles of matter that may still adhere to the apron. The dried material falls into a receptacle S and may be afterward conveyed away in wagons S' for further treatment, if desired, the materials being conveniently discharged into the wagons through an opening S² in the bottom of the receptacle provided with a shutter or door S³. When returning back to the receiving end of the apparatus, the surface of the apron B, from which the solid matters have been removed, is subjected to a beating, cleansing, and drying process in the following way: Shortly after leaving the revolving brush R the cleared surface of the apron passes over a comparatively long water-trough T, in which work revolving beaters U, fixed on shafts U', driven through belts and pulleys U² and connected to each other by belts and pulleys U³. The beaters U are made of flexible material, and as they rotate in the water-trough T they act on the apron B, so as to beat and wash it, and thereby thoroughly cleanse its surface. The cleansed portion of the apron after leaving the water-trough T is passed over steam drying-boxes (not shown) or equivalent drying appliances, so that its surface is thoroughly dried before it reaches the carrying-drum E' and is thus thoroughly cleansed and prepared to act efficiently again in a continuous manner.

Having thus described the nature of this invention and the best means I know of carrying the same into practical effect, I claim—

1. Apparatus for separating liquids from solids comprising an endless apron or carrier consisting of chain-links having brackets to which wire-gauze is attached and permeable fabric held down on the gauze by suitable devices and arranged to travel around drums mounted at each end of a framing, vacuum-boxes and vacuum-pumps, washing-pipes and rakes arranged over the vacuum-boxes, steam drying boxes or coils, a scraper and revolving brush and appliances for cleansing and washing the apron, all arranged and operating substantially as and for the purposes set forth.

2. In apparatus of the character described, an apron consisting of chain-links having brackets to which wire-gauze is attached and of permeable fabric held down on the gauze by flanged clips connected by bent-leather filling-pieces which with the clips form sides to the apron, substantially as described.

In testimony whereof I have hereunto set my hand in presence of two subscribing witnesses.

DUNCAN STEWART.

Witnesses:
ROBERT HENDERSON,
JOHN ANDERSON.